United States Patent
Zhang

(10) Patent No.: US 9,787,734 B2
(45) Date of Patent: Oct. 10, 2017

(54) METHODS AND DEVICES FOR SWITCHING BETWEEN PEER-TO-PEER AND MULTIMEDIA BROADCAST MULTICAST SERVICE

(71) Applicant: Telefonaktiebolaget L M Ericsson (publ), Stockholm (SE)

(72) Inventor: Shunliang Zhang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 247 days.

(21) Appl. No.: 14/422,962

(22) PCT Filed: Oct. 31, 2012

(86) PCT No.: PCT/IB2012/056072
§ 371 (c)(1),
(2) Date: Feb. 20, 2015

(87) PCT Pub. No.: WO2014/033507
PCT Pub. Date: Mar. 6, 2014

(65) Prior Publication Data
US 2015/0222678 A1    Aug. 6, 2015

(51) Int. Cl.
*H04L 29/06* (2006.01)
*H04L 29/08* (2006.01)
(Continued)

(52) U.S. Cl.
CPC ........ *H04L 65/4076* (2013.01); *H04L 12/189* (2013.01); *H04L 67/1044* (2013.01);
(Continued)

(58) Field of Classification Search
CPC ............ H04L 65/4076; H04L 67/1091; H04L 67/1044; H04L 67/22; H04L 12/189;
(Continued)

(56) References Cited

U.S. PATENT DOCUMENTS 8,447,284 B1 *   5/2013   Lee .................. H04W 4/06
                                                 455/3.01
9,226,265 B2 *  12/2015   Gupta ............. H04W 72/005
(Continued)

FOREIGN PATENT DOCUMENTS

AT    WO 2004102878 A1 *  11/2004  ............. H04L 29/06
CN         101163324 A         4/2008
(Continued)

OTHER PUBLICATIONS

International Search Report issued in corresponding International application No. PCT/IB2012/056072, date of mailing of the report Aug. 23, 2013.
(Continued)

*Primary Examiner* — Kostas Katsikis
(74) *Attorney, Agent, or Firm* — Patent Portfolio Builders PLLC

(57) ABSTRACT

Methods and radio communication network systems enable switching between P2P-based streaming and MBMS-based streaming depending on a number of peers in the same area, streaming the same content and having an MBMS-based streaming capability.

18 Claims, 12 Drawing Sheets

(51) Int. Cl.
*H04W 4/06* (2009.01)
*H04N 21/218* (2011.01)
*H04N 21/44* (2011.01)
*H04N 21/63* (2011.01)
*H04L 12/18* (2006.01)
*H04W 76/00* (2009.01)
*H04W 72/00* (2009.01)
*H04W 88/18* (2009.01)
*H04W 76/04* (2009.01)

(52) U.S. Cl.
CPC ..... *H04L 67/1091* (2013.01); *H04N 21/2181* (2013.01); *H04N 21/44016* (2013.01); *H04N 21/632* (2013.01); *H04W 4/06* (2013.01); *H04W 76/002* (2013.01); *H04L 67/22* (2013.01); *H04W 72/005* (2013.01); *H04W 76/04* (2013.01); *H04W 88/18* (2013.01)

(58) Field of Classification Search
CPC ......... H04N 21/2181; H04N 21/44016; H04N 21/632; H04W 4/06; H04W 76/002; H04W 72/005; H04W 76/04; H04W 88/18
See application file for complete search history.

(56) References Cited

U.S. PATENT DOCUMENTS

| | | | | |
|---|---|---|---|---|
| 9,282,354 B2* | 3/2016 | Lo | ............ | H04L 67/306 |
| 9,319,836 B2* | 4/2016 | Jodlauk | ............ | H04W 4/021 |
| 2007/0172068 A1* | 7/2007 | Herrmann | ............ | H04L 29/06 |
| | | | | 380/278 |
| 2007/0177592 A1 | 8/2007 | Mooney et al. | | |
| 2008/0022012 A1* | 1/2008 | Wang | ............ | H04L 47/10 |
| | | | | 709/238 |
| 2008/0112352 A1* | 5/2008 | Kuo | ............ | H04W 36/22 |
| | | | | 370/312 |
| 2008/0313351 A1* | 12/2008 | Mobasser | ............ | H04L 65/4076 |
| | | | | 709/241 |
| 2009/0180417 A1* | 7/2009 | Frost | ............ | H04W 72/005 |
| | | | | 370/312 |
| 2010/0061247 A1* | 3/2010 | He | ............ | H04W 72/005 |
| | | | | 370/241 |
| 2010/0250704 A1* | 9/2010 | Kittel | ............ | G06F 21/10 |
| | | | | 709/219 |
| 2011/0021224 A1* | 1/2011 | Koskinen | ............ | H04W 72/005 |
| | | | | 455/507 |
| 2012/0057697 A1* | 3/2012 | Holtmanns | ............ | H04L 9/0838 |
| | | | | 380/42 |
| 2012/0202493 A1* | 8/2012 | Wang | ............ | H04W 60/00 |
| | | | | 455/435.1 |
| 2013/0021971 A1* | 1/2013 | Jain | ............ | H04W 76/02 |
| | | | | 370/328 |
| 2013/0097305 A1* | 4/2013 | Albal | ............ | H04W 76/00 |
| | | | | 709/224 |
| 2013/0188546 A1* | 7/2013 | Turtinen | ............ | H04W 8/005 |
| | | | | 370/312 |
| 2013/0294321 A1* | 11/2013 | Wang | ............ | H04W 4/06 |
| | | | | 370/312 |
| 2014/0301267 A1 | 10/2014 | Gou et al. | | |
| 2015/0381675 A1* | 12/2015 | Damola | ............ | H04L 65/4076 |
| | | | | 709/219 |

FOREIGN PATENT DOCUMENTS

| | | | | |
|---|---|---|---|---|
| CN | 101192941 A | | 6/2008 | |
| CN | EP 2387165 A3 | * | 5/2012 | .......... H04W 72/005 |
| CN | 102651846 A | * | 8/2012 | .......... H04W 72/005 |
| CN | 102695130 A | | 9/2012 | |
| FI | WO 2005020520 A3 | * | 5/2005 | .......... H04L 12/1877 |
| WO | 2007/107715 A2 | | 9/2007 | |
| WO | WO 2013063483 A2 | * | 5/2013 | .......... H04L 67/306 |
| WO | WO 2013166423 A3 | * | 4/2014 | .............. H04W 4/06 |

OTHER PUBLICATIONS

3GPP; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); TS 36.300 V11.1.0 (Mar. 2012).
International Search report issued in corresponding International application No. PCT/CN2012/080880, date of mailing of report Jun. 6, 2013.
Written Opinion of the International Searching Authority issued in International application No. PCT/CN2012/080880, date of completion of this opinion May 30, 2013.

* cited by examiner

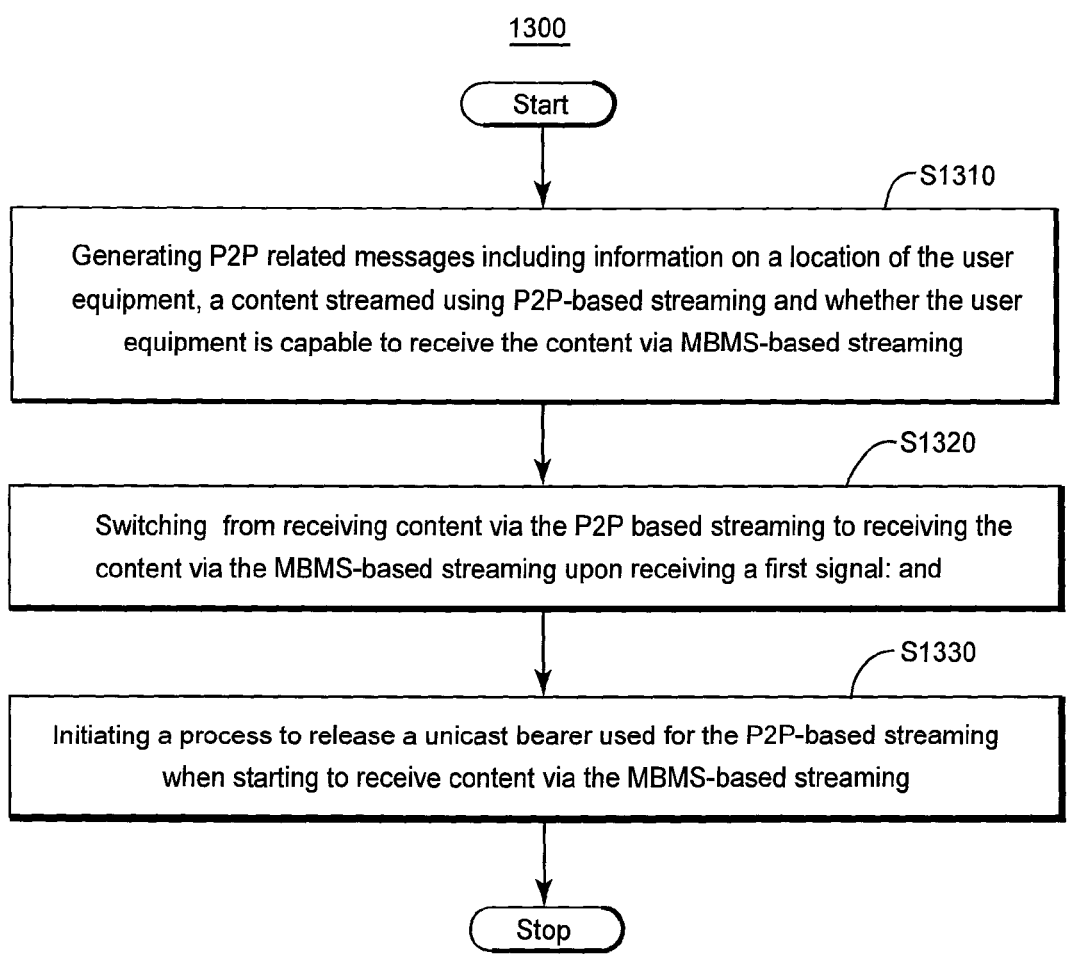

METHODS AND DEVICES FOR SWITCHING BETWEEN PEER-TO-PEER AND MULTIMEDIA BROADCAST MULTICAST SERVICE

TECHNICAL FIELD

The present invention generally relates to methods and devices for switching between peer-to-peer (P2P) and multimedia broadcast multicast service (MBMS) in order to optimize downlink and/or better handle the network overhead in a radio communication network system.

BACKGROUND

Due to the rapid increase of smart-phone usage, data traffic on mobile networks has experienced explosive growth. Data streaming (such as video streaming) represents a significant part of data traffic. According to some estimates, video streaming accounts for 39% of mobile data traffic, and will account for about 70% of all mobile data traffic by 2016. In view of this trend, methods for data streaming are subject to continuing study and development.

P2P is a popular method of data streaming. Some P2P-based streaming systems have being quite successful in the context of fixed access networks. For example, a peer-to-peer streaming video network created at Huazhong University of Science and Technology in China (PPlive) is estimated to have about 110 million users, 2 million concurrent online peers, and over 600 channels. In another example, Chinese peer-to-peer streaming video network software, PPstream, has been installed on about 350 million devices and is used daily by about 12 million users. Most P2P-based streaming systems are quite scalable by making use of uplink (UL) contribution from a large number of peers. Due to the advantages of P2P systems, several leading Content Distribution Network (CDN) manufacturers, such as Akamai, have started to implement P2P capabilities in their CDN systems.

Conventional P2P-based streaming systems used in fixed networks face some serious problems in mobile networks. For example, UL transmissions from mobile user equipment (UE) consume a lot of power, and the P2P system heavily uses UL transmissions from peers. Additionally, in typical P2P-based streaming systems, a large number peers exchange a large number of P2P signaling messages besides data packages. P2P signaling messages (exchanged very frequently, e.g., 1-10 ms, with an average IP packet size of less than 100 bytes) have been observed to be quite harmful to mobile networks.

MBMS is a point-to-multipoint method for data service in 3GPP mobile networks like 3G and LTE used to provide data services to a large number of user equipments which may be mobile. In fact, MBMS may have plural other functions (streaming being only one of them) serving a large number of UEs. MBMS can be used to simultaneously stream the same content to multiple mobile users in the same area by broadcast over radio interface, thereby saving radio resource and avoiding high power consumption. However, if the number of users streaming the same content becomes small, MBMS will not be radio resource efficient.

The number of mobile peers located in one or more LTE cells in the same broadcasting area receiving the same streaming content may change dynamically. For example, in a conventional P2P system 100 as illustrated in FIG. 1, sometimes only one or two of the peers 101a-101d in an LTE cell 110 receive the same streaming content (e.g., from the channel server 130 or from peer 101e via interface 140), while at other times, tens of peers in the same LTE cell 110 are receiving the same content. The content sources may be connected via the Internet rather than the core network 120 directly. Although the core network 120 may be configured to provide MBMS services, conventionally, it is not possible to optimize resource usage (i.e., saving downlink (DL) LTE resources or not overloading radio interfaces) by considering the number of peers receiving the same streamed content because P2P service is an Internet-based over-the-top (OTT) service which is usually independent of which operator owned MBMS system.

A mobile deputy module has been considered for deployment in a radio access network device of a core network (RAN) or at the edge of core network to optimize P2P system and make P2P system more friendly to mobile networks. As illustrated in FIG. 2, in a radio communication network system 200, the presence of the mobile deputy 205 splits the P2P system 200 into two parts: a simplified P2P portion and a normal portion. The deputy 205 acts as a proxy for all the peers inside the simplified P2P portion, being the only "neighbor" of the peers 201a-201d inside the simplified P2P portion. However, the P2P deputy operates only relative to streaming toward the peers in the simplified P2P portion (i.e., not retrieving streaming from mobile peers 201a-201d to peers in the normal network). The presence of the mobile deputy 205 results in avoiding UL contribution from mobile peers and significantly alleviates P2P signaling over radio links. However, one potential problem for the deputy is scalability, i.e., the deputy could be a potential bottleneck in the system when a large number of mobile peers in the simplified P2P portion are served simultaneously by the deputy. When the deputy is overloaded, it is likely that many peers are streaming the same P2P content (live streaming case), but the usage of DL is not optimized.

FIG. 3 illustrates a recently developed approach to optimizing load related to P2P live streaming, between a P2P live streaming network 320 (providing a P2P-based streaming service to peers 301a and 301b communicating via base stations 310a and 310b) and an access network 340. A node 325 operates in the streaming network 320 as a Mobile Cloud Accelerator Peer to Peer (MCAP2P).

If a peer 301a asks a tracker 330 to provide a list of peers streaming content related to an IPTV channel 1, the MC2 P2P node 325 intercepts peer 301a's request and increments a number of peers watching channel 1, storing the peer's ID. Peer 301a receives the list of peers, connects to these peers and starts using the P2P-based streamed content.

If then another peer 301b asks the tracker to provide the list of peers streaming content related to the IPTV channel 1, the MC2 P2P node 325 intercepts peer 301b's request and identifies that more than a predetermined number of peers T (which is set by MNO) are already streaming content related to the IPTV channel 1. Then, the MC2 P2P node 325 joins P2P network to receive content related to the IPTV channel 1 from selected sources. The MC2 P2P node 325 starts converting the P2P stream into an eMBMS format, and opens an eMBMS socket. Further, the MC2 P2P node 325 signals to all peers streaming content related to the IPTV channel 1 to switch from P2P (unicast) streaming and to connect to the eMBMS socket. The peers streaming content related to the IPTV channel 1 (e.g., peer 301a and peer 301b) stop P2P-based streaming, join a multicast tree and start receiving content related to the IPTV channel 1 via multicast form MC2 P2P node 325.

The MC2 P2P-based approach has the disadvantage that it requires the mobile network/MC2 P2P to intercept and analyze P2P related messages in order to estimate the numbers of peers streaming the same content. When the number users is large, analyzing the large number of P2P related messages becomes a challenge. Additionally, the P2P traffic may be encrypted.

Accordingly, it would be desirable to have methods and radio communication network systems able to provide streaming services to mobile users while optimizing network resource usage and avoiding bottlenecks.

SUMMARY

Methods and radio communication network systems enable switching between P2P-based streaming and MBMS-based streaming based on the number of peers in the same area, streaming the same content and having an MBMS-based streaming capability.

According to one exemplary embodiment, there is a method for switching between P2P-based streaming and MBMS-based streaming in a radio communication network system, the method being performed by a device connected to core network components of the radio communication system and to an MBMS control system. The method includes counting located in a broadcast area, streaming same content using P2P-based streaming and having an MBMS-based streaming capability. The method further includes causing the core network components, the BM-SC and the peers located in the broadcast area, streaming the same content using P2P-based streaming and having the MBMS-based streaming capability to switch from P2P-based streaming to MBMS-based streaming, if a number of counted peers exceeds a first predetermined number. Here, a peer is any user equipment in the radio communication network that receives content using P2P-based streaming.

According to another exemplary embodiment, a radio communication network system is configured to provide data streaming to users. The radio communication network system includes a device connected to core network components of the radio communication network system and an MBMS control system, the device being configured (A) to count peers located in a broadcast area, streaming same content using P2P and having an MBMS-based streaming capability, and (B) if a number of counted peers exceeds a first predetermined number, to cause the core network components, the BM-SC and the peers switching from P2P-based streaming to MBMS-based streaming.

According to another exemplary embodiment a device in a radio communication network system has an interface configured to enable communication with other devices in the radio communication network system, and a data processing unit connected to the interface. The data processing unit is configured (A) to count peers located in a broadcast area, streaming same content using P2P-based streaming and having an MBMS-based streaming capability, and (B) to cause core network components, an BM-SC and the peers located in the broadcast area, streaming the same content using P2P-based streaming and having MBMS-based streaming capability to switch from P2P-based streaming to MBMS-based streaming, if a number of counted peers exceeds a first predetermined number.

According to another exemplary embodiment, a user equipment in a radio communication network has an interface configured to enable communication with other devices in the radio communication network system, and a data processing unit connected to the interface. The data processing unit is configured, while receiving content via P2P-based streaming, to generate P2P related messages including information on location of the user equipment, a content streamed using P2P-based streaming and whether the user equipment is capable to receive the content via an MBMS-based streaming.

According to another exemplary embodiment a method performed by a user equipment in a radio communication system includes generating P2P related messages including information on a location of the user equipment, a content streamed using P2P-based streaming and whether the user equipment is capable to receive the content via MBMS-based streaming. The method further includes switching from receiving content via the P2P based streaming to receiving the content via the MBMS-based streaming upon receiving a first signal. The method finally includes initiating a process to release a unicast bearer used for the P2P-based streaming when starting to receive content via the MBMS-based streaming.

It is an object to overcome some of the deficiencies discussed in the previous section and to provide methods and systems to stream while optimizing network resource usage by switching between P2P-based and MBMS-based streaming services and avoiding bottlenecks.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 13 is a flowchart of a method for switching between P2P and MBMS according to another exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a radio communication network system capable of providing data streaming to mobile users.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
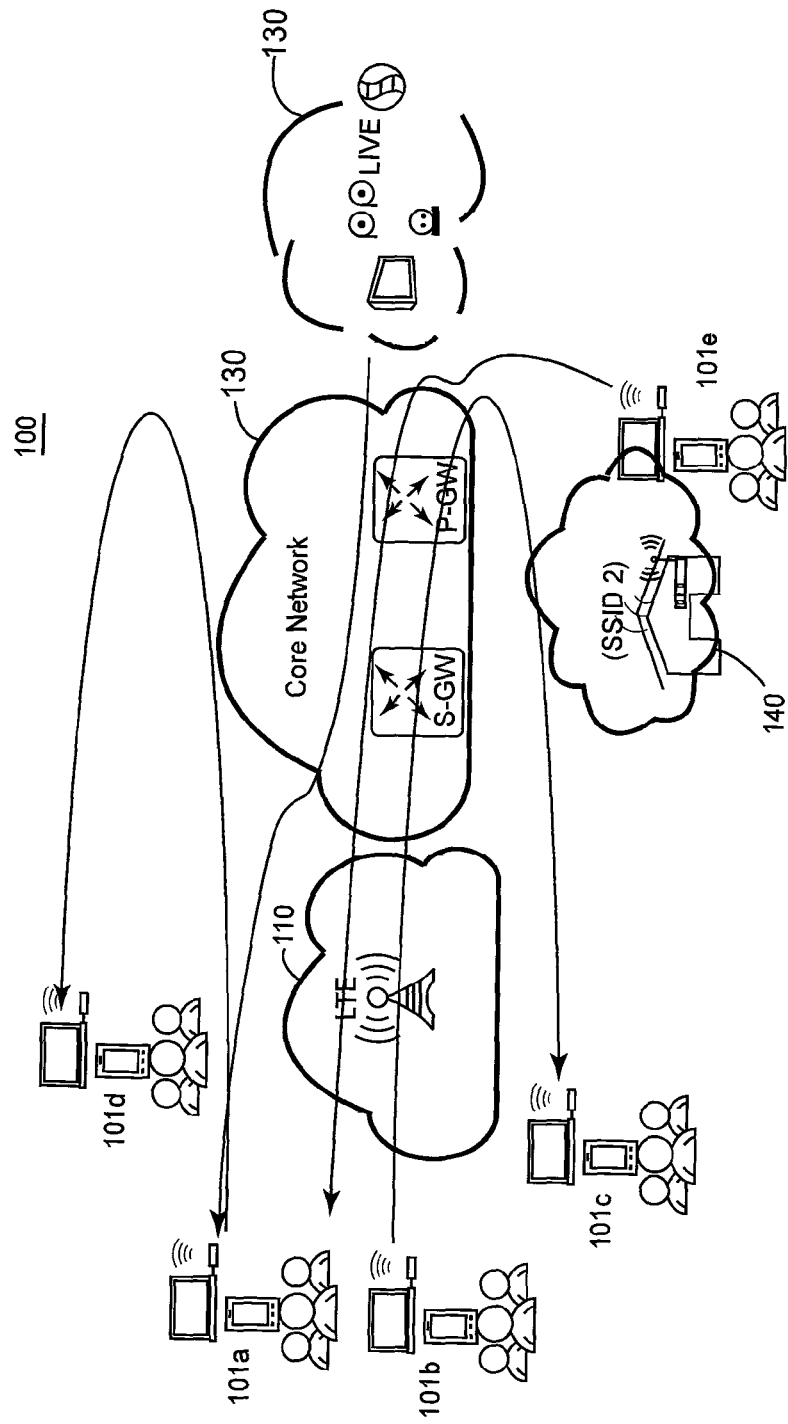
FIG. 1 is a schematic diagram of a conventional P2P system.
Figure 2:
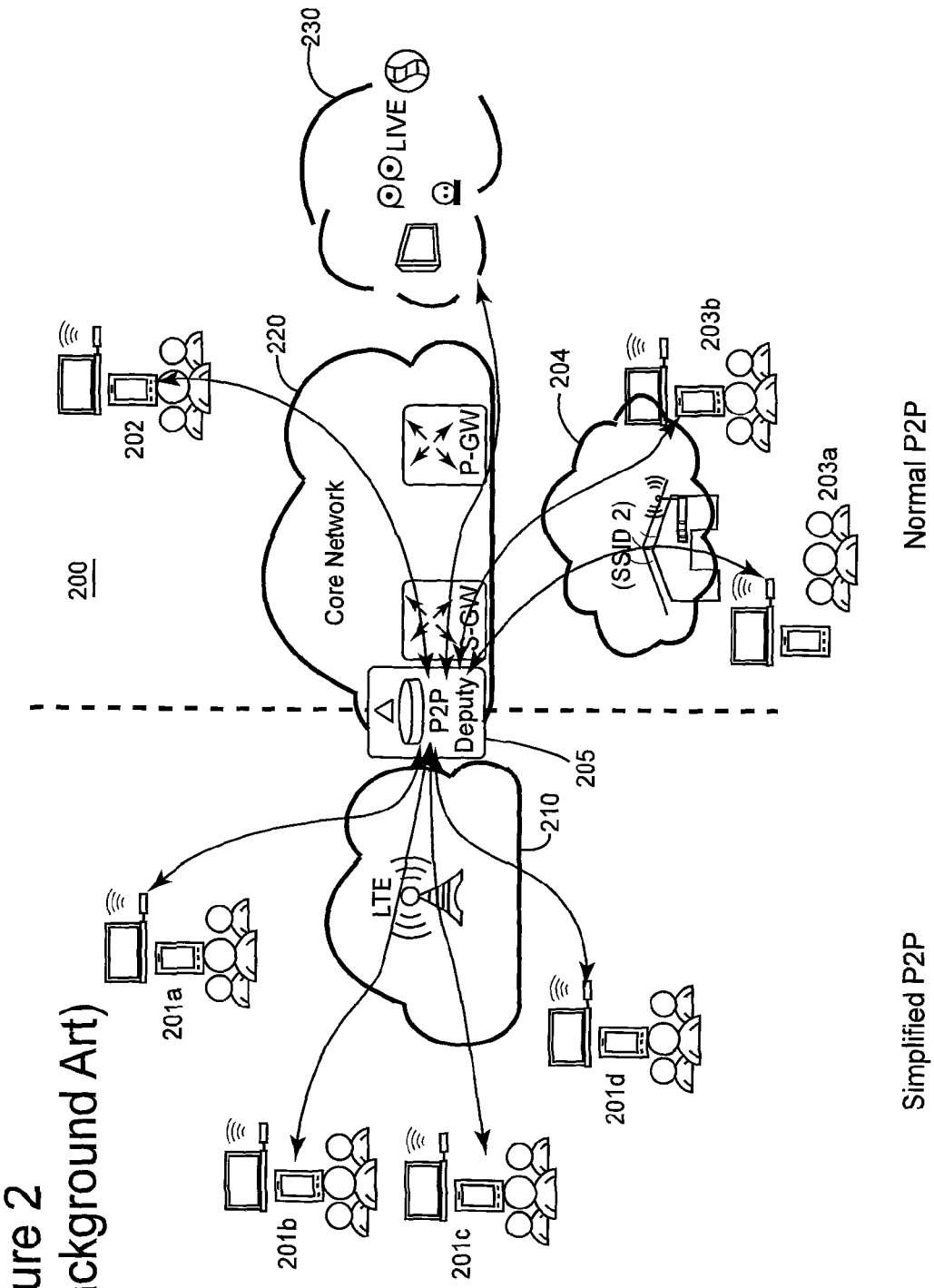
FIG. 2 is a schematic diagram of another conventional P2P system.
Figure 3:
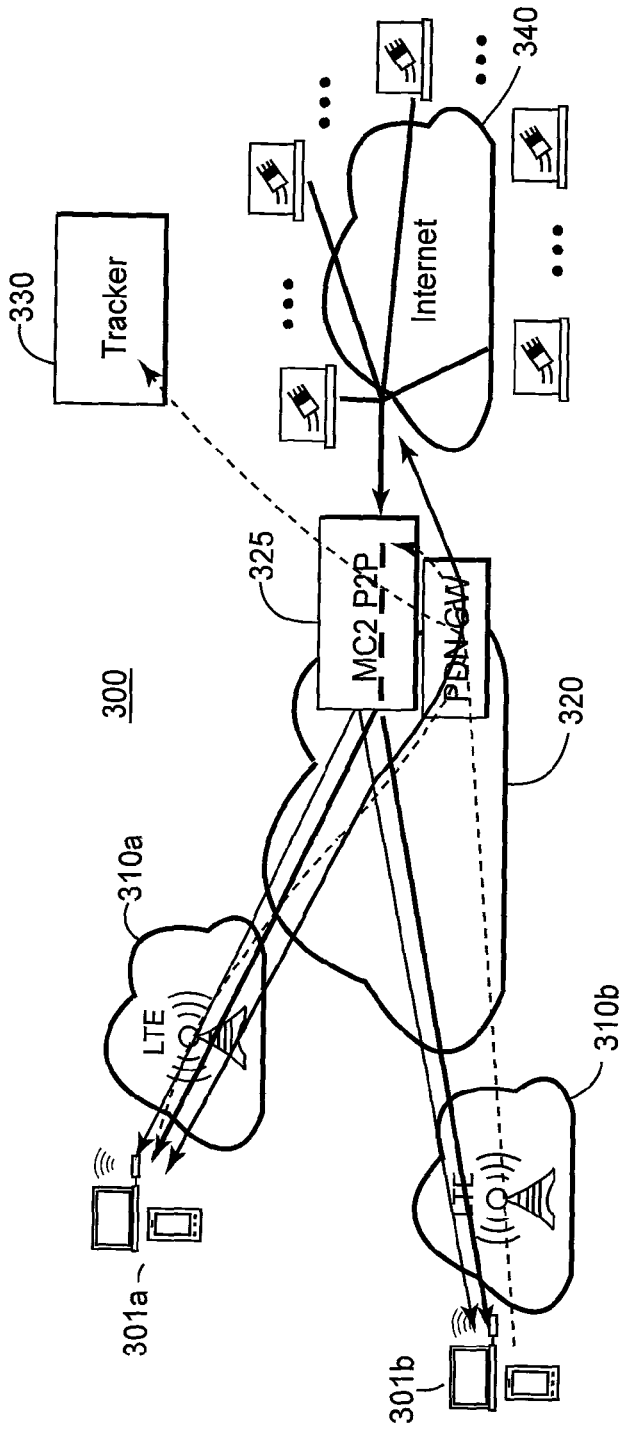
FIG. 3 is a schematic diagram of yet another conventional P2P system.
Figure 4:
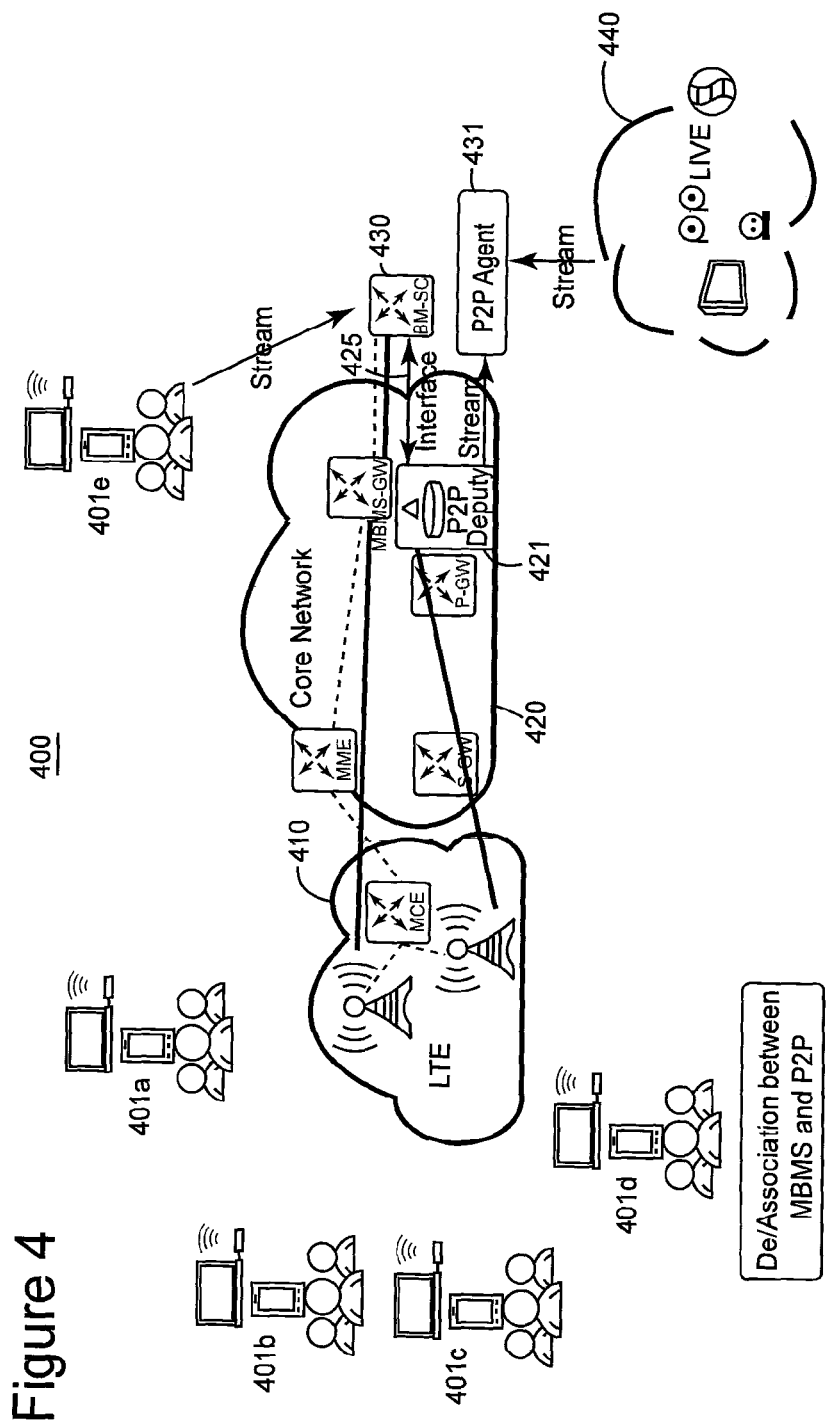
FIG. 4 is a schematic diagram of a radio communication network system capable of providing data streaming to mobile users according to an exemplary embodiment.

FIG. 4 illustrates a radio communication network system 400 capable of providing data streaming to mobile users (i.e., peers) 401a-401e according to an exemplary embodiment. The core network 420 is configured to stream data using P2P and MBMS services. Some of the users may be located in the same geographic area so they may receive streaming via the MBMS service. An interface 425 is introduced between the mobile P2P deputy 421 and the MBMS control system (BM-SC) 430 to coordinate the streaming delivery mode over mobile networks, i.e., to determine how and when to dynamically switch between MBMS mode and P2P mode. The radio communication network system 400 is characterized by:

1. The P2P deputy 421 may acquire locations of served mobile peers (UEs) 401a-401d from collocated core network components or from UEs, and counts the number of mobile peers located in the same cell 410 (or the same area including plural cells) and involved in the same streaming (e.g., from the same server 440). The mobile peers 401a-401d may include mobile peer-related information, location info such as location (cell ID) and whether the peer has MBMS-based streaming capability, into the P2P messages exchanged with the P2P deputy 421.
2. If the load of the P2P deputy 421 is approaching a certain threshold, or the number of mobile peers located in the same area and involved in the same streaming reaches a predetermined threshold number, the P2P deputy 421 initiates switching from P2P-based streaming to MBMS-based streaming.
3. To accomplish the switching from P2P-based streaming to MBMS-based streaming, the P2P deputy 421 informs the BM-SC 430 by sending a request message. The request message may include information on the streaming content to be broadcasted (e.g., a channel ID), the broadcast area (e.g., one or more cell IDs), and a source peer list or channel server (e.g., 440) to enable the P2P agent/client/super node 431 collocated with the BM-SC 430 to acquire streaming content. Based on the request message from the P2P deputy 421, the BM-SC 430 triggers the collocated P2P agent/client/super node 431 to retrieve the streaming content.
4. Upon receiving an MBMS service notice indicating that an ongoing P2P-based streaming will be replaced by MBMS-based streaming, the UE stops P2P client function and initiates the process for releasing a related unicast bearer when the streaming content starts being delivered by MBMS. Conversely, upon receiving an MBMS service notice indicating that ongoing MBMS-based streaming will be stopped, the UE may initiate the process for re-establishing unicast bearers and may restart P2P client functions to continue streaming the content.
5. To facilitate seamlessly switching between MBMS-based streaming and P2P-based streaming, the BM-SC 430 may inform the P2P deputy 421 that MBMS service will be stopped and that streaming service to some peers needs to continue. Then, the P2P deputy 421 may actively set up P2P connections with these peers to continue streaming content without any interruption.

The peers receiving content via streaming services often use it immediately. For example, a peer may play video or audio content. In this way, live TV or radio broadcasts may be followed by a user. However, being "live" is not to be limiting. Users may simply want to listen a music recording uninterrupted.

Figure 5:
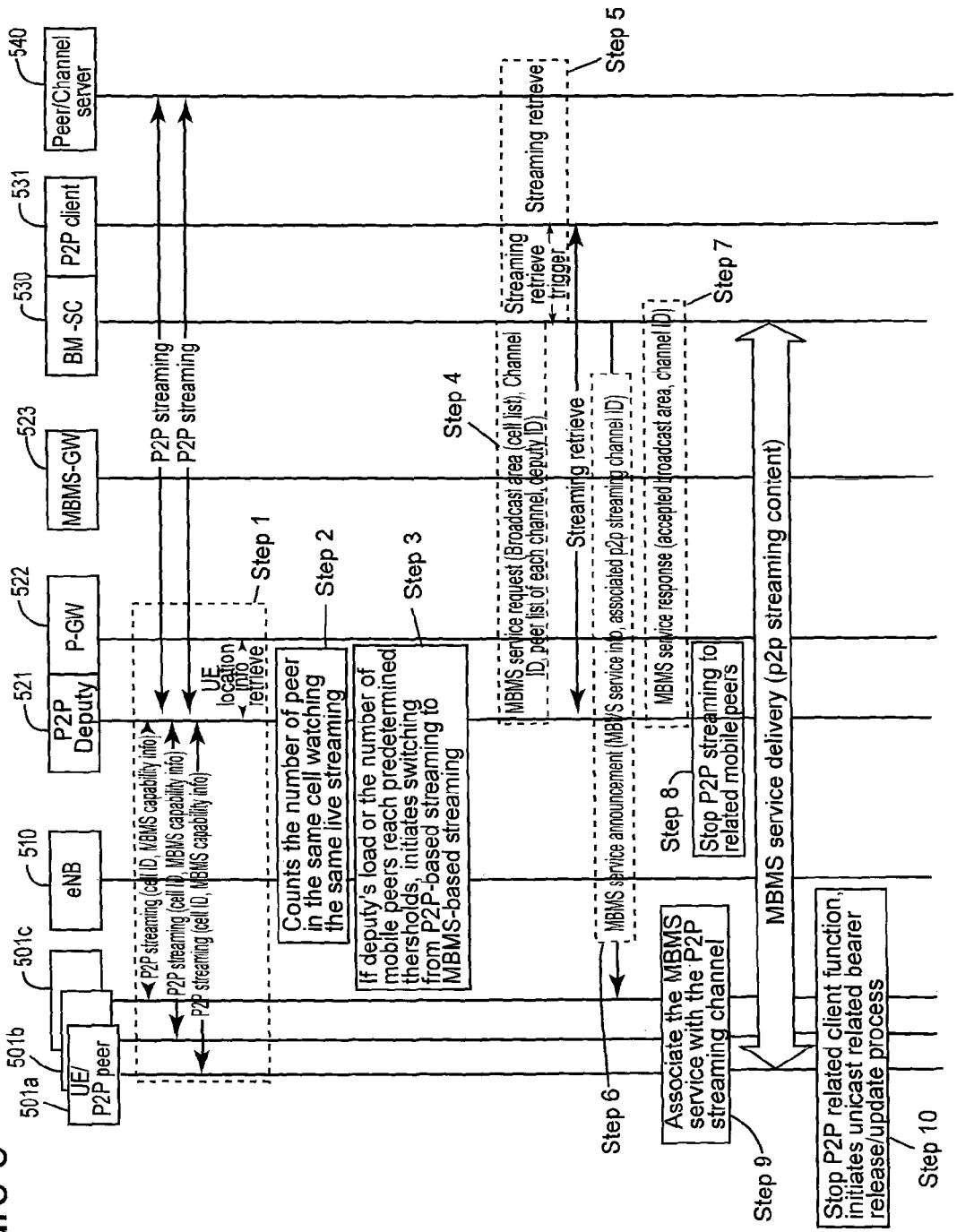
FIG. 5 is a flowchart of a method for switching from P2P to MBMS service according to an exemplary embodiment.

A method for switching from P2P to MBMS service in a system similar to the system 400 is described in detail based on FIG. 5. The eNB 510 and the core network components (P-GW 522 and MBMS-GW 523) may indicate modules providing functionality as known in the art for radio communication network systems (as described, for example, by current 3GPP and LTE standard documents). FIG. 5 illustrates a time coordinate of the steps in a time-ordered sequence from top to bottom.

At STEP 1, the mobile P2P deputy 521 retrieves context information related to mobile peers (e.g., the UE/P2P peers 501a, 501b, 501c, etc.) using P2P-based streaming. This context information may include location information (cell ID) and whether peers have MBMS-based streaming capability. The context information may be retrieved from a collocated mobile network element (e.g., P-GW 522) with a request message, which includes the ID/IP of the related peers (i.e., receiving the same content using P2P-based streaming). Alternatively, the mobile peers may include context information into P2P messages exchanged with the P2P deputy 421.

At STEP 2, the P2P deputy 521 counts the number of mobile peers (UEs) located in the same area streaming the same content and having MBMS-based streaming capability.

At STEP 3, if the load of the P2P deputy 521 is approaching a certain threshold or if the number of peers as counted at STEP 2 exceeds a predetermined threshold number (e.g., 5), the P2P deputy 521 initiates the transition from P2P-based streaming to MBMS-based streaming.

At STEP 4, the P2P deputy 521 sends a message (such as an MBMS service request) to the BM-SC 530 (which may be identified based on public land mobile network (PLMN) information) to trigger switching from P2P-based streaming to MBMS based-streaming. The message may indicate the broadcast area (e.g., a list of cell IDs), the streaming content to be broadcasted (which content may be indicated by an IPTV channel ID), and the source peer list associated with the streaming content to enable the BM-SC 530 to retrieve streaming content. The P2P deputy 521 may also provide access point name (APN) information to enable the BM-SC 530 to find the right MBMS-GW (e.g., 523).

At STEP 5, upon receiving the message from P2P deputy 521, the BM-SC 530 completes related processes, such as authorization. Then the BM-SC 530 triggers the collocated P2P client/agent/super node 531 to retrieve streaming packets from the peer/channel server 540.

At STEP 6, before initiating the MBMS-based streaming service, the BM-SC 530 initiates a service notice process to the mobile peers (UEs) 501a-501c located in the same area streaming the same content and having MBMS-based streaming capability. The service notice may indicate that upcoming MBMS-based streaming will replace ongoing P2P-based streaming.

At STEP 7, when the system is set up and has the resources to stream using MBMS, the BM-SC 530 sends a response message to the P2P deputy 521. The response message may indicate the accepted broadcast area. It is possible for the broadcast service to be temporarily unacceptable in a targeted area.

At STEP 8, the P2P deputy 521 terminates the ongoing P2P sessions, with mobile peers switching to MBMS-based streaming according to the response message from the BM-SC 530.

At STEP 9, upon receiving an MBMS service notice message indicating that upcoming MBMS service will replace ongoing unicast (P2P) service, the mobile peer (i.e., any of the UEs 501a-501c streaming the same content) associates the upcoming MBMS service with the ongoing P2P streaming service. The mobile peer switches from receiving the content via a unicast bearer (i.e., P2P-based streaming) to receiving it via the corresponding broadcast bearer (i.e., MSMS-based streaming).

At STEP 10, upon receiving streaming content via the broadcast bearer, the mobile peer (e.g., 501a) stops the P2P session with the P2P deputy 521 and initiates the process of releasing the unicast bearer previously used for P2P-based streaming.

Figure 6:
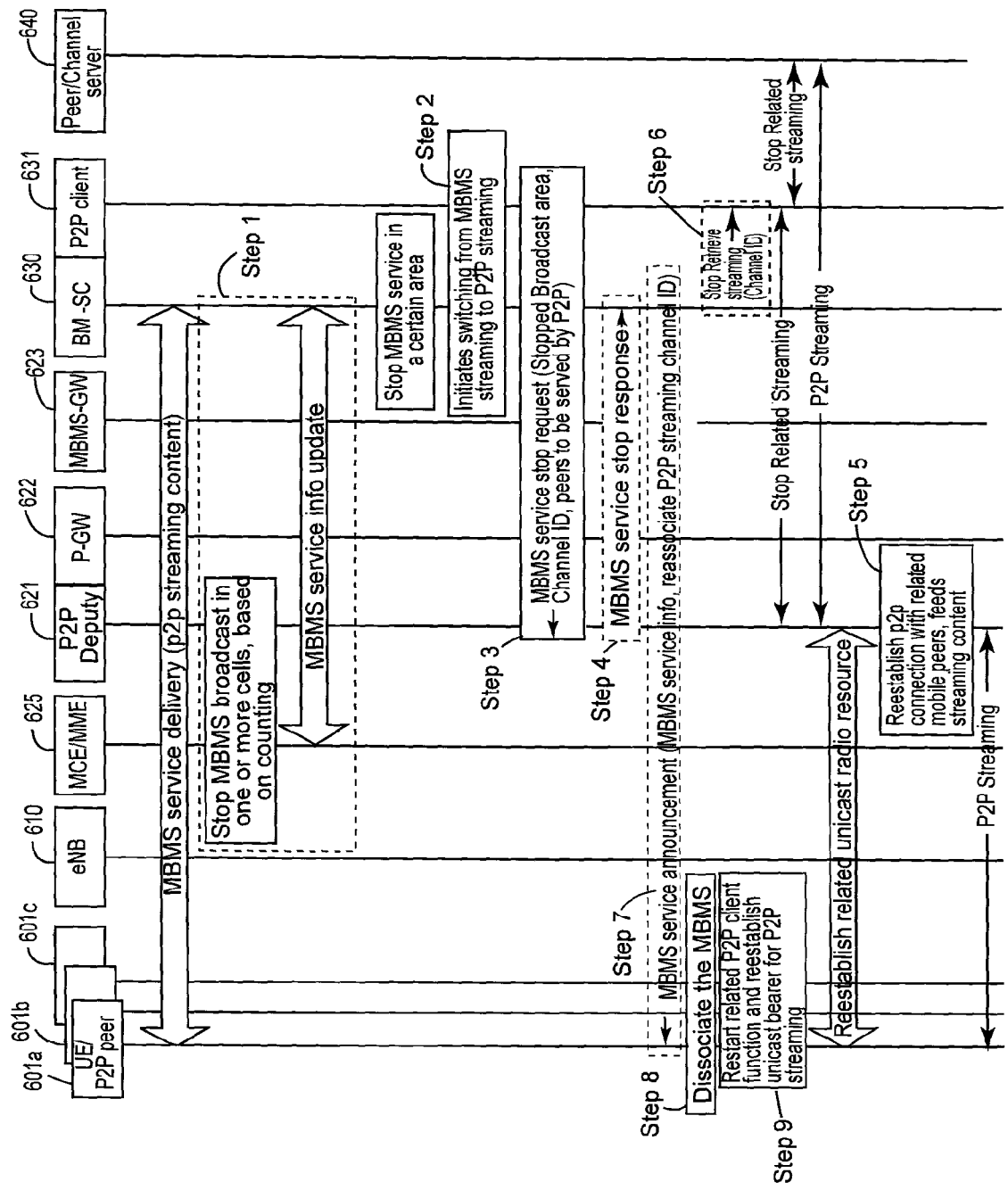
FIG. 6 is a flowchart of a method for switching from MBMS to P2P service according to an exemplary embodiment.

A method for switching from MBMS to P2P service in a system similar to the system 400 is described in detail based on FIG. 6. The eNB 610, and the core network components specified in FIG. 6 (i.e., the multi-cell/multicast coordination entity (MCE) or mobile management entity (MME) 625, P-GW 622 and MBMS-GW 623) may indicate modules providing functionality as known in the art for the radio communication network system (described, for example, by current 3GPP and LTE standard documents). FIG. 6 illustrates a time coordinate of the steps in a time-ordered sequence from top to bottom.

At STEP 1 in FIG. 6, based on a counting result, the MCE/MME 625 may decide to terminate one or more ongoing MBMS-based streaming service sessions. For example, if the number of mobile peers (UEs) located in the same area streaming the same content in an MBMS session becomes less than a predetermined threshold number (e.g., 5), the MCE/MME 625 informs the BM-SC 630 about terminating the respective MBMS session and indicates the peers that continue streaming.

At STEP 2, based on information received at STEP 1 from the MCE/MME 625, the BM-SC 630 initiates switching from MBMS-based streaming to P2P-based streaming for the peers (UEs) that continue streaming.

At STEP 3, the BM-SC 630 sends a message to the P2P deputy 621 to inform that broadcast-based streaming will be stopped to these peers (UEs) and to provide P2P-based streaming for the peers that continue streaming.

At STEP 4, the P2P deputy 621 may send a confirmation message to the BM-SC 630.

At STEP 5, the P2P deputy 621 may initiate a process to re-establish P2P sessions for the peers that continue streaming to seamlessly provide content.

At STEP 6, the BM-SC 630 triggers the collocated P2P client/agent/super node to stop retrieving packets related to streaming from the streaming content source (e.g., a peer or a channel server 640).

Meanwhile, at STEP 7, the BM-SC 630 initiates a change of service notice to inform the peers that ongoing MBMS-based streaming will be replaced by P2P-based streaming.

At STEP 8, upon receiving this change of service notice, the peers dissociate the MBMS service from the ongoing streaming service.

If a peer continues streaming, at STEP 9, the peer initiates a related unicast bearer re-establishment process for the P2P-based streaming service. In other words, the peer switches from the broadcast bearer to the unicast bearer and continues receiving streamed content using the P2P service.

Figure 7:
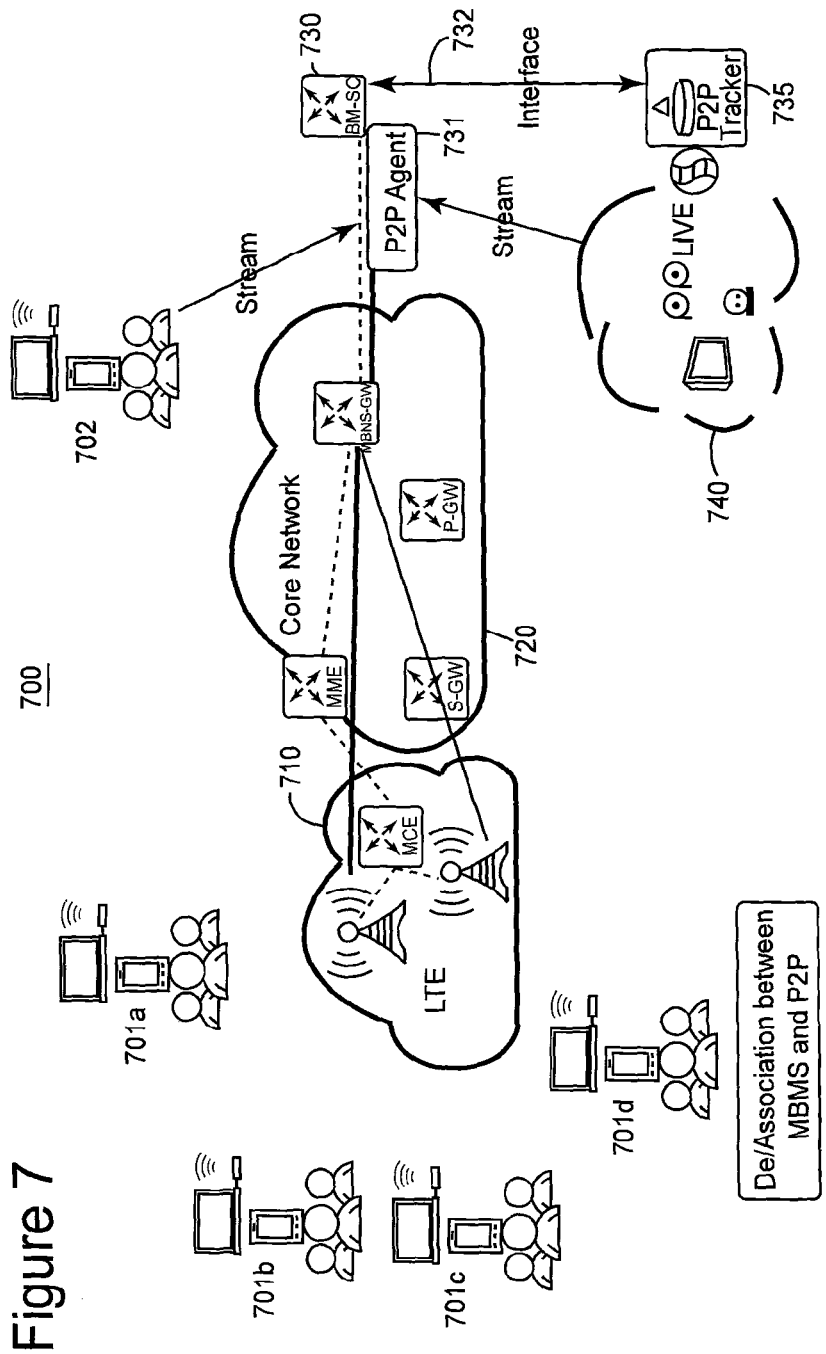
FIG. 7 is a schematic diagram of a radio communication network system capable of providing data streaming to mobile users according to another exemplary embodiment.

According to another exemplary embodiment illustrated in FIG. 7, there is a radio communication network system 700 capable of providing data streaming to mobile users (i.e., peers) 701a-701d. The core network 720 is configured to stream data from a peer 702 or a channel server 740 using P2P and MBMS services. Some of the users may be located in the same geographic area so they may receive streaming via the MBMS service.

An interface 732 is introduced between the P2P tracker 735 and the MBMS control system (BM-SC) 730 to coordinate the streaming delivery mode over mobile networks, i.e., to determine how and when to dynamically switch between MBMS mode and P2P mode. A collocated P2P client/agent/super node 731 is introduced near the BM-SC 730 to stream packets in P2P mode. Based on information received from the core network 720, a peer (e.g., one of the UEs 701a-701d) may switch between MBMS broadcast bearer and P2P unicast bearer according to the streaming mode. As previously discussed, the peer receiving streamed content may feed this content to a media player continuously (i.e., live). The radio communication network system 700 is characterized by:

1. P2P messages (such as a registration request) related to a peer (e.g., a mobile UE such as any of 701a-701d) received by the P2P tracker 735 may include the peer's cell ID, PLMN, MBMS-based streaming capability and possible P-GW ID info/APN info. This information may be provided by mobile peers when sending P2P messages or added by a core network component intercepting P2P messages.
2. The P2P tracker 735 may store this information (i.e., cell ID, PLMN ID, MBMS-based streaming capability, request content/channel, etc.) related to the peers receiving content via a P2P service. The P2P tracker may then count the number of peers (UEs) in the same area having MBMS-based streaming capability and streaming the same content. If the number reaches a predetermined threshold number, the P2P tracker 735 initiates switching from P2P-based streaming to MBMS-based streaming. Meanwhile, a list of peers streaming the same content (i.e., related peers) may be maintained by the P2P agent/client/super node 731 collocated with the BM-SC 730 to stream the content in P2P mode.
3. To accomplish the switching from P2P-based streaming to MBMS-based streaming, the P2P tracker 735 informs the BM-SC 730 (or another BM-SC identified by related PLMN/P-GW ID information) by sending a message. The message may include the streaming content (e.g., channel ID) to be broadcasted, the broadcast area (e.g., one or more cell IDs), and a source peer list or channel server (e.g., 702 or 740) in order to enable the P2P agent/client/super node 731 collocated with the BM-SC 730 to acquire the streaming content.
4. Upon receiving an indication about switching from P2P-based streaming to MBMS-based streaming from the P2P tracker 735, the BM-SC 730 triggers the collocated P2P agent/client/super node 731 to retrieve the streaming content according to the information received from the P2P tracker 735 in order to continue providing streamed content without any interruption.

5. If the number of peers located in the same area receiving the same streaming content becomes lower than a predetermined threshold number, the BM-SC 730 may initiate switching from MBMS-based streaming to P2P-based streaming. The system 700 performs switching seamlessly so that peers continue receiving streamed content without any interruption. To facilitate the seamless switching, the BM-SC 730 may inform the P2P tracker 735 that MBMS-based streaming service will be stopped and that some peers needs to continue streaming. Then, the P2P tracker 735 may actively cause re-establishing of P2P connections with these peers to continue providing streamed content and to ensure the same QoE while switching as during regular streaming.

6. Upon receiving an MBMS service notice indicating that P2P-based streaming will be replaced by MBMS-based streaming, the UE stops P2P client function and initiates the process for releasing a related unicast bearer when the streaming content is delivered by MBMS. Conversely, upon receiving an MBMS service notice indicating that MBMS-based streaming will be stopped, the UE may initiate the process for re-establishing a unicast bearer and may restart P2P client function to continue receiving content using the P2P-based streaming service.

Figure 8:
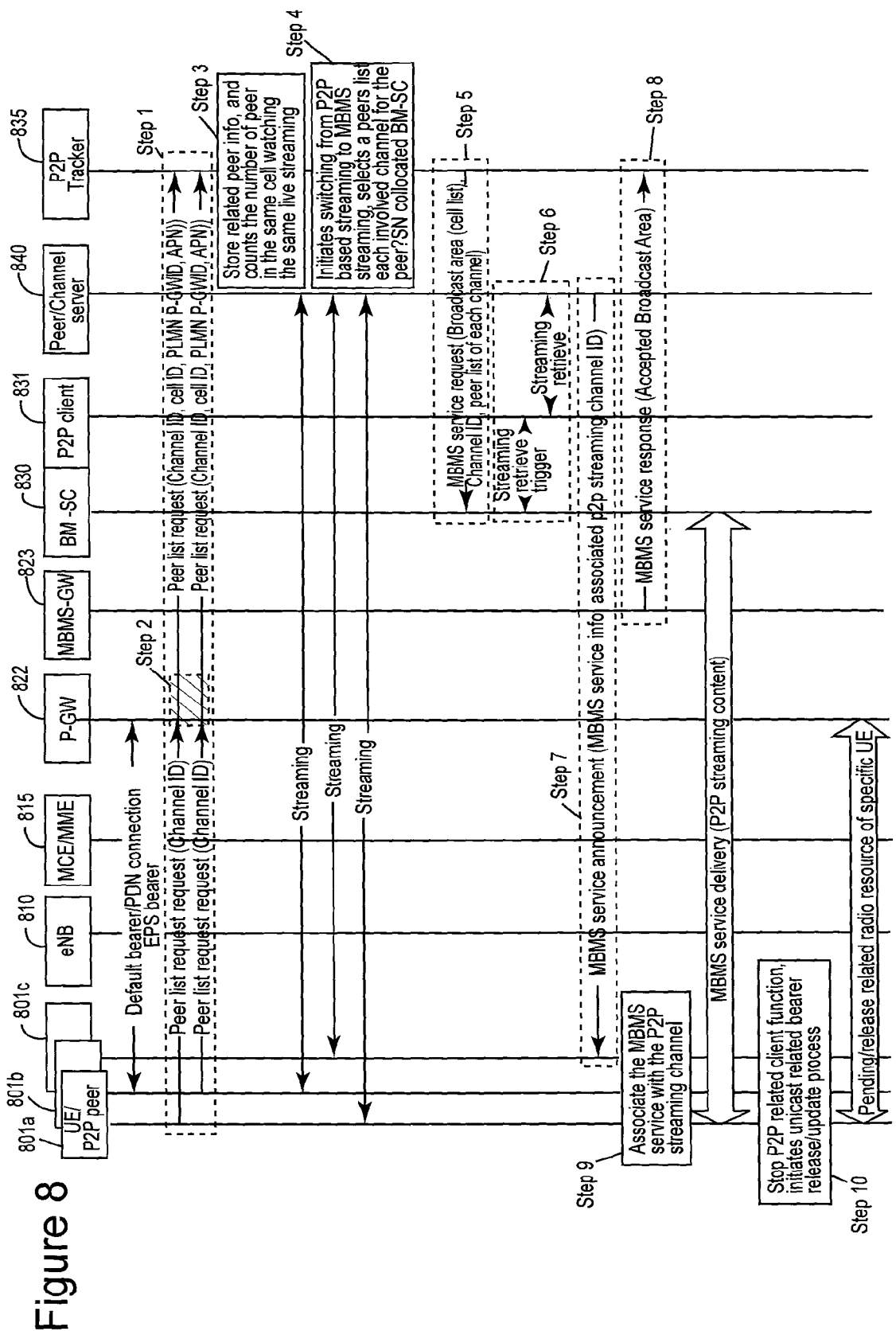
FIG. 8 is a flowchart of a method for switching from P2P to MBMS service according to another exemplary embodiment.

A method for switching from P2P to MBMS service in a system similar to the system 700 is described in detail based on FIG. 8. The eNB 810 and the core network components (P-GW 822, MCE/MME 815 and MBMS-GW 823) may indicate modules providing functionality as known in the art for radio communication network systems (as described, for example, by current 3GPP and LTE standard documents). FIG. 8 illustrates a time coordinate of the steps in a time-ordered sequence from top to bottom.

At STEP 1, a peer (e.g., mobile UE 801b) sends a peer list request/registration message to the P2P tracker 835 seeking neighbor peers involved in the same streaming channel. Optionally, the peer may include additional information (such as, the peer's cell ID, PLMN ID, MBMS-based streaming capability, APN of the gateway used for accessing the streaming service).

At STEP 2, the P-GW/GGSN 822 detects (intercepts) the peer list request/registration message sent from a mobile peer (e.g., any of 801a-801c) to the P2P tracker 835. As an alternative to the above-described STEP 1, if the mobile peer cannot include the necessary information in the peer list request/registration message, the P-GW/GGSN 822 may add this information to the request/registration message. The P-GW/GGSN 822 may also add P-GW ID information in order to enable the P2P tracker 835 to identify the BM-SC 830.

At STEP 3, the P2P tracker 835 stores the information related to the peer that sent the message, and uses it to decide whether to initiate switching to MBMS-based streaming to serve more efficiently from a radio resources' point of view (e.g., to avoid radio interface overloading) peers in the same area streaming the same content and having MBMS-based streaming capability.

At STEP 4, the P2P tracker 835 counts the number of peers in the same area streaming the same content and having MBMS-based streaming capability. If the number exceeds a predetermined threshold number (e.g., 5), the P2P tracker 835 initiates switching from P2P-based streaming to MBMS-based streaming.

At STEP 5, the P2P tracker 835 sends a request message (such as an MBMS service request) to the BM-SC 830 (which may be identified using PLMN information) to trigger switching from P2P-based streaming to MBMS-based streaming. The message may indicate the broadcast area (e.g., a list of cell IDs), the streaming content to be broadcast (e.g., a channel ID), a source peer list associated with each channel for the BM-SC 830 to retrieve the streaming content. Related APN information may be used by the BM-SC 830 to find the right MBMS-GW. In the case of Selected IP Traffic Overload (SIPTO), an L-MBMS-GW may be deployed.

At STEP 6, upon receiving the request message from the P2P tracker 835, the BM-SC 830 completes related processes, such as authorization. Then the BM-SC 830 triggers the collocated P2P client/agent/super node 831 to retrieve necessary streaming content from the sources on the list.

At STEP 7, before initiating the actual MBMS-based streaming service, the BM-SC 830 initiates a service notice process to the mobile peers (UEs) 801a-801c located in the same area, streaming the same content and having MBMS-based streaming capability. The service notice may indicate that upcoming MBMS-based streaming will replace ongoing P2P-based streaming.

At STEP 8, when all the components and resources are set for MBMS-based streaming, the BM-SC 830 sends a response message to the P2P tracker 835 indicating the accepted broadcast area. It is possible for the broadcast service to be temporarily unacceptable in a targeted area.

At STEP 9, upon receiving an MBMS service notice message indicating that upcoming MBMS-based streaming service will replace ongoing unicast (P2P-based) streaming service, the mobile peer (i.e., one of 801a-801c streaming the same content) associates the upcoming MBMS service with the ongoing P2P service. The mobile peer switches from receiving the streamed content via a unicast bearer (P2P) to receiving the streamed content via the corresponding broadcast bearer (MBMS).

At STEP 10, upon receiving streaming content via the broadcast bearer, the mobile peer (e.g., 801b) stops the P2P session and initiates the process of releasing the unicast bearer previously used for P2P-based streaming.

Figure 9:
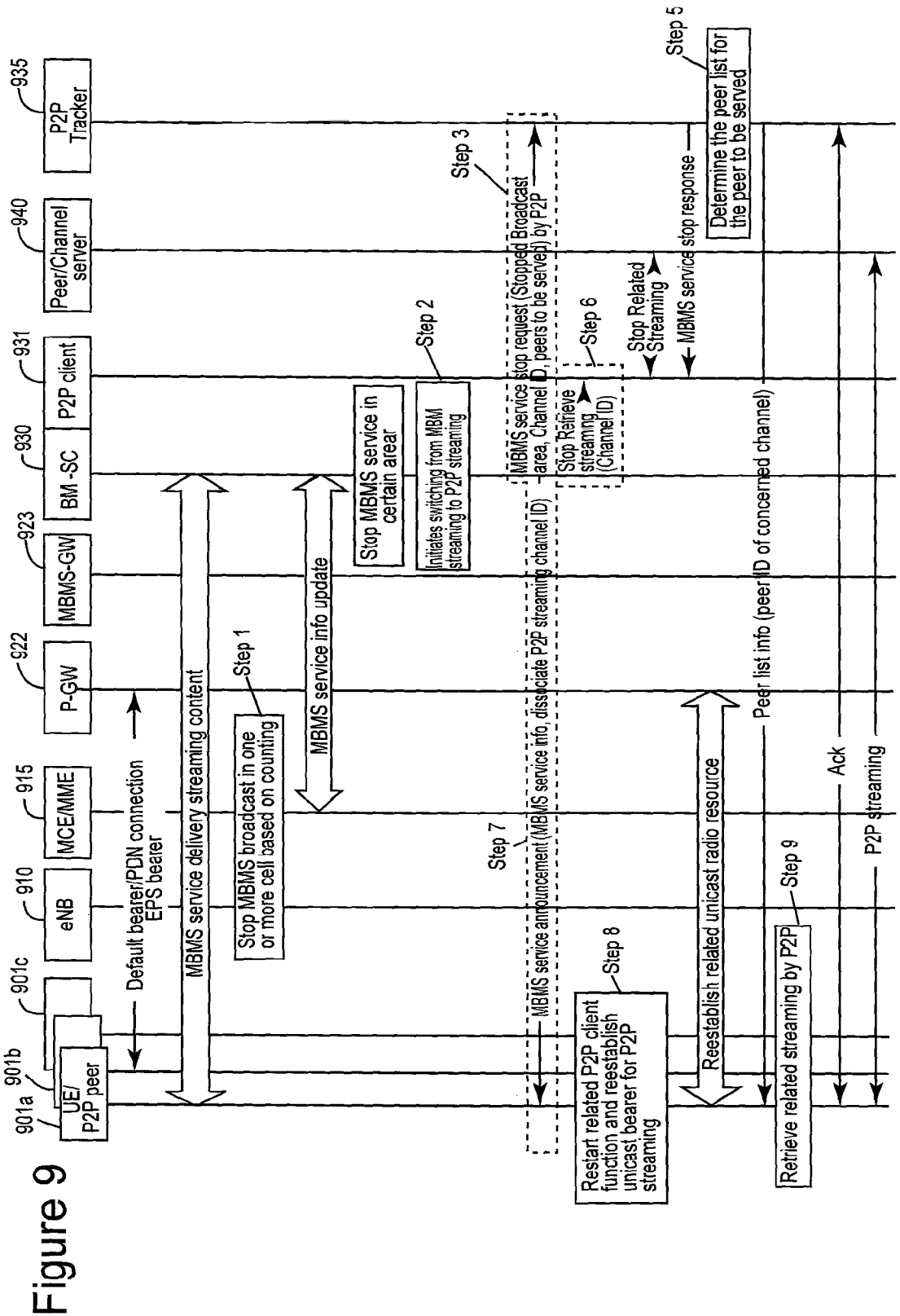
FIG. 9 is a flowchart of a method for switching from MBMS to P2P service according to another exemplary embodiment.

A method for switching from MBMS to P2P service in a system similar to the system 700 is described in detail based on FIG. 9. The eNB 910 and the core network components (multi-cell/multicast coordination entity (MCE) or mobile management entity (MME) 915, P-GW 922 and MBMS-GW 923) may indicate modules providing functionality as known in the art for the radio communication network system (described, for example, by current 3GPP and LTE standard documents). FIG. 9 illustrates a time coordinate of the steps in a time-ordered sequence from top to bottom.

At STEP 1, based on a counting result, the MCE/MME 915 may decide to terminate one or more ongoing MBMS-based streaming service sessions. For example, if the number of mobile peers (UEs) located in the same area and streaming the same content in an MBMS session becomes less than a predetermined threshold number (e.g., 5), the MCE/MME 915 informs the BM-SC 930 about terminating the respective MBMS session, and indicates the peers that continue streaming using P2P service.

At STEP 2, based on information received at STEP 1 from the MCE/MME 915, the BM-SC 930 initiates switching from MBMS-based streaming to P2P-based streaming for the peers (UEs) that continue streaming.

At STEP 3, the BM-SC 930 sends a request message to the P2P tracker 935 to inform that MBMS-based streaming service will be stopped and to provide P2P-based streaming for the peers that continue streaming. This message may include the IDs of the peers that need to continue receiving streaming content.

At STEP 4, the P2P tracker 935 may send a confirmation message to the BM-SC 930.

At STEP 5, in order to facilitate continuity of streaming to the peers, the P2P tracker 935 may produce a peer list for each channel, including information related to the active mobile peers.

At STEP 6, the BM-SC 930 triggers the collocated P2P client/agent/super node 931 to stop retrieving packets related to streaming from the streaming content source (e.g., a peer or a channel server 940).

Meanwhile, at STEP 7, the BM-SC 930 initiates a change of service notice to inform the peers that ongoing MBMS-based streaming will be replaced by P2P-based streaming.

At STEP 8, upon receiving this change of service notice, the peers dissociate the MBMS service from the ongoing streaming service.

If a peer continues streaming, at STEP 9, the peer initiates the related unicast bearer re-establishment process for the P2P-based streaming service. In other words, the peer switches from the broadcast bearer to the unicast bearer and continues receiving streamed content using the P2P service.

Use of the above-described methods (for switching between MBMS and P2P service) provides the advantage that radio resource usage is optimized when plural peers (UEs) located in the same area (cell) stream the same content.

Another advantage is that switching from P2P to MBMS has less impact than conventional approach due to the new interface linking P-GW/GGSN and BM-SC. Unlike when using a MCAP2P module, no a deep packet inspection (DPI) function for identifying the same P2P-based streaming traffic. Identifying streaming traffic (i.e., P2P-based streaming channel ID) may cause substantial resource usage which would lead to MCAP2P module overload.

Additionally the methods according to various embodiments describe above may work in broader situations, e.g., when SIPTO is applied to P2P traffic, or when P2P traffic is securely protected.

Figure 10:
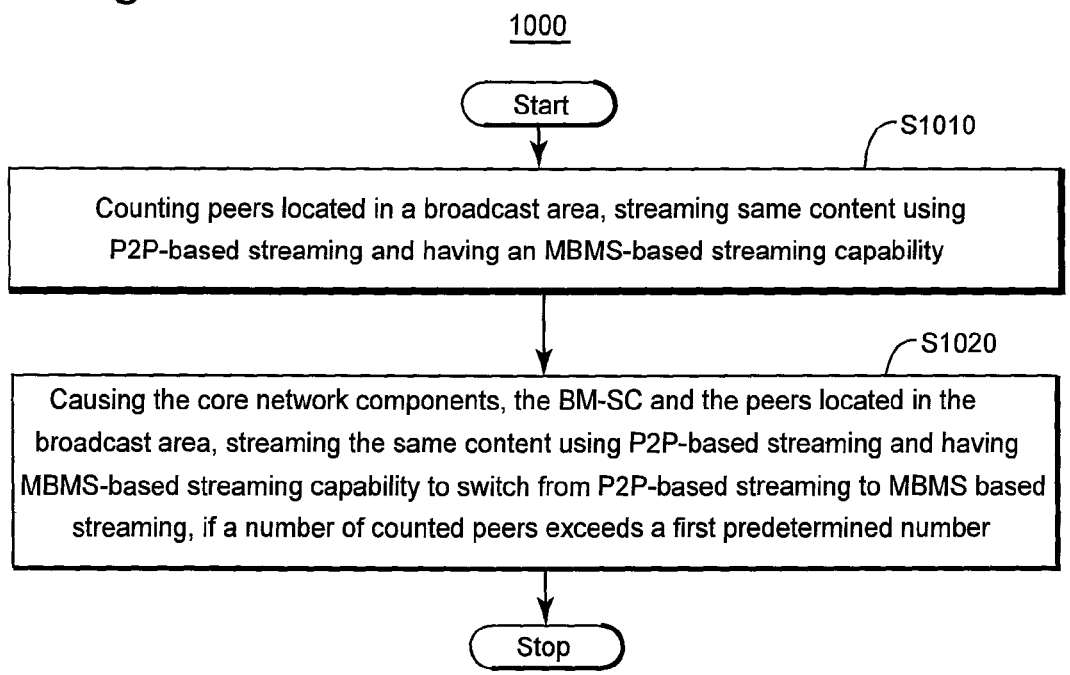
FIG. 10 is a flowchart of a method for switching between P2P and MBMS according to another exemplary embodiment.

In a more general view, FIG. 10 is a flow diagram of a method 1000 for switching between P2P-based streaming and MBMS-based streaming in a radio communication network system according to another exemplary embodiment. The method may be performed by a device connected to core network components of the radio communication network system and to an MBMS control system (BM-SC). The device may be a P2P tracker or a P2P deputy. The P2P tracker operates as a directory service for any peer seeking content. The P2P deputy operates as a proxy of the mobile peers located in the broadcast area, streaming the same content using P2P-based streaming and having the MBMS-based streaming capability, relative to other peers, the P2P deputy being also the only peer for each of the peers located in the broadcast area, streaming the same content using P2P-based streaming and having the MBMS-based streaming capability. The proxy is working on P2P level which is above of the core network level despite it may interwork with core network.

At S1010, method 1000 includes counting peers located in a broadcast area (i.e., one or more radio cells) streaming the same content using P2P and having an MBMS-based streaming capability. Further, at S1020, method 1000 includes causing the core network components, the BM-SC and the peers located in the broadcast area, streaming the same content using P2P-based streaming and having the MBMS-based streaming capability to switch from P2P-based streaming to MBMS-based streaming, if a number of counted peers exceeds a predetermined number. Here the term "peer" means any user equipment receiving content using P2P-based streaming.

Upon starting to receive the content via the MBMS-based streaming, each of the peers switching from P2P-based streaming to MBMS-based streaming may initiate the process to release a respective unicast bearer that has been used for P2P-based streaming.

Method 1000 may further include causing the core network components, the BM-SC and the peers to switch from MBMS-based streaming to P2P-based streaming if a number of peers located in the broadcast area and streaming the same content using MBMS decreases below a second predetermined number. The first predetermined number and the second predetermined number may be different numbers or may be equal. Each of the peers switching from MBMS-based streaming to P2P-based streaming may initiate a process to re-establish a respective unicast bearer to be used for P2P-based streaming.

Method 1000 may further include the device receiving P2P-related messages, including information on location of an individual peer, the content streamed by the individual peer using P2P-based streaming and whether the individual peer has MBMS-based streaming capability. The device may then perform the counting based on this information.

In one embodiment, the P2P related messages generated by the peers are intercepted by a core network component that adds to the P2P related messages at least some of the information included in the P2P related messages received by the device. In an alternative embodiment, one or more peers using P2P-based streaming generate the P2P related messages including the information.

The same content initially received by peers using P2P-based streaming is related to an IPTV channel.

Figure 11:
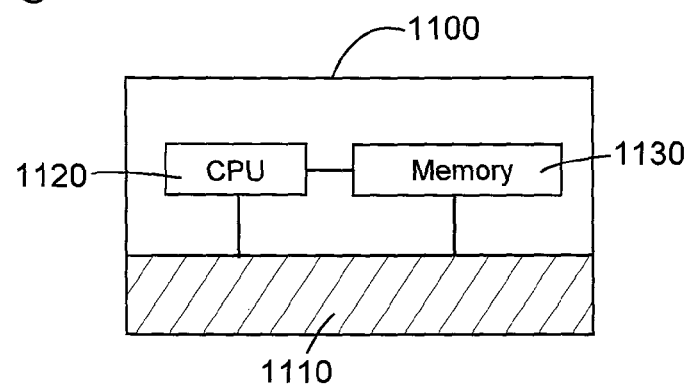
FIG. 11 is a block diagram of a device according to an exemplary embodiment.

FIG. 11 is a block diagram of a device 1100 in a radio communication network system according to another exemplary embodiment. The device has an interface 1110 configured to enable communication with other devices in the radio communication network system, and a data processing unit 1120 connected to the interface 1110.

The data processing unit 1120 is configured to count peers located in a broadcast area, streaming same content using P2P-based streaming and having an MBMS-based streaming capability, and (B) to cause core network components, an BM-SC and the peers located in the broadcast area, streaming the same content using P2P-based streaming and having MBMS-based streaming capability to switch from P2P-based streaming to MBMS-based streaming, if a number of counted peers exceeds a first predetermined number.

The device may include a memory 1130 non-transitorily storing executable codes that make the device perform a method for switching between peer-to-peer (P2P) streaming and multimedia broadcast multicast (MBMS) streaming in a radio communication network system (e.g., the method 1000).

Figure 12:
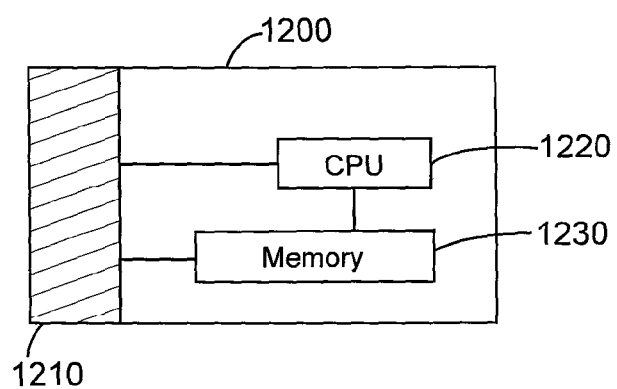
FIG. 12 is a block diagram of a user equipment according to an exemplary embodiment.

FIG. 12 is a block diagram of a user equipment 1200 in a radio communication network system according to another exemplary embodiment. The user equipment has an interface 1210 configured to enable communication with other devices in the radio communication network system, and a data processing unit 1220 connected to the interface 1210.

The data processing unit 1220 is configured to generate P2P related messages including information on location of the user equipment, a content streamed using P2P-based streaming and whether the user equipment is capable to receive the content via an MBMS-based streaming.

The data processing unit 1220 may be further configured to switch from receiving content via the P2P-based streaming to receiving the content via the MBMS-based streaming upon receiving a first signal, and initiate a process to release a unicast bearer used for the P2P-based streaming when starting to receive content via the MBMS-based streaming. The data processing unit 1220 may also be configured to switch from receiving content via the MBMS-based streaming to receiving the content via the P2P-based streaming upon receiving a second signal.

A flow diagram of a method 1300 performed by a user equipment (e.g., 1200) in a radio communication system (e.g., 400, 700) is illustrated in FIG. 13. Method 1300 includes generating P2P related messages including information on a location of the user equipment, a content streamed using P2P-based streaming and whether the user equipment is capable to receive the content via MBMS-based streaming, at S1310. Method 1300 further includes switching from receiving content via the P2P based streaming to receiving the content via the MBMS-based streaming upon receiving a first signal, at S1320. Method 1300 finally includes initiating a process to release a unicast bearer used for the P2P-based streaming when starting to receive content via the MBMS-based streaming, at S1330.

Method 1300 may also include initiating a process to re-establish the unicast bearer upon receiving a second signal, and then, switching from receiving content via the MBMS-based streaming to receiving the content via the P2P-based streaming.

The user equipment 1200 may further include a memory 1230 non-transitorily storing executable codes that make the user equipment perform a method for switching between peer-to-peer (P2P) streaming and multimedia broadcast multicast (MBMS) streaming (e.g., the method 1300).

The disclosed exemplary embodiments provide radio communication network systems capable of providing data streaming, devices and methods for switching between P2P-based streaming and MBMS-based streaming in these systems. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

The exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such a floppy disk or magnetic tape. Other non-limiting examples of computer-readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method for switching between a peer-to-peer (P2P) streaming service and a multimedia broadcast multicast streaming (MBMS) service in a radio communication network system, the method being performed by a device connected to core network components of the radio communication network system and to an MBMS control system (BM-SC), the method comprising:
   counting peers located in a broadcast area, streaming same content using P2P-based streaming and having an MBMS-based streaming capability; and
   causing the core network components, the BM-SC, and the peers located in the broadcast area, streaming the same content using P2P-based streaming and having the MBMS-based streaming capability to switch from P2P-based streaming to MBMS-based streaming, if a number of counted peers exceeds a first predetermined number, at least by sending a request message to the BM-SC to trigger the switch from the P2P-based streaming to the MBMS-based streaming,
   wherein a peer is a user equipment initially receiving content using P2P-based streaming,
   wherein the P2P streaming service is an Internet-based over-the-top (OTT) service,
   wherein the device decides whether to initiate the switch from P2P-based streaming to MBMS-based streaming,
   wherein a multi-cell/multicast coordination entity (MCE)/mobile management entity (MME) decides, based on a counting of peers, to terminate the MBMS-based streaming and informs the BM-SC of the decision to terminate, and the BM-SC informs the device that the MBMS-based streaming will be terminated.

2. The method of claim 1, wherein the device is a P2P tracker, which operates as a directory service for any peer seeking content.

3. The method of claim 1, wherein the device is a P2P deputy which operates as a proxy of the peers located in the broadcast area, streaming the same content using P2P-based streaming and having the MBMS-based streaming capability, relative to other peers, the P2P deputy being also the only peer for each of the peers located in the broadcast area, streaming the same content using P2P-based streaming and having the MBMS-based streaming capability.

4. The method of claim 1, wherein upon starting to receive the content via the MBMS-based streaming, each of the peers switching from P2P-based streaming to MBMS-based streaming initiates a process to release a respective unicast bearer that has been used for P2P-based streaming.

5. The method of claim 1, further comprising:
   causing the core network components, the BM-SC and the peers to switch from MBMS-based streaming to P2P-based streaming if a number of peers located in the broadcast area and streaming same content using MBMS decreases below a second predetermined number.

6. The method of claim 5, wherein each of the peers switching from MBMS-based streaming to P2P-based streaming initiates a process to re-establish a respective unicast bearer to be used for P2P-based streaming.

7. The method of claim 1, further comprising:
receiving P2P related messages, each message including information on location of an individual peer, the content streamed by the individual peer using P2P-based streaming and whether the individual peer has MBMS-based streaming capability,
wherein the device performs the counting based on the information.

8. The method of claim 7, wherein the P2P related messages generated by the peers are intercepted by a core network component that adds to the P2P related messages at least some of the information included in the P2P related messages received by the device.

9. The method of claim 7, wherein one or more peers using P2P-based streaming generate the P2P related messages including the information.

10. The method of claim 1, wherein the same content initially received by peers using P2P-based streaming is related to an IPTV channel.

11. A radio communication network system configured for switching between a peer-to-peer (P2P) streaming service and a multimedia broadcast multicast streaming (MBMS) service in a radio communication network system, the system comprising:
a device connected to core network components of the radio communication network system and an MBMS control system (BM-SC), the device being configured (A) to count peers located in a broadcast area, streaming same content using the P2P streaming service and having an MBMS-based streaming service capability, and (B) if a number of counted peers exceeds a first predetermined number, to cause the core network components, the BM-SC, and the peers switching from P2P-based streaming to MBMS-based streaming at least by sending a request message to the BM-SC to trigger the switch from the P2P-based streaming to the MBMS-based streaming,
wherein a peer is a user equipment in the radio communication network that initially receives content using P2P-based streaming,
wherein the P2P-based streaming service is an Internet-based over-the-top (OTT) service,
wherein the device decides whether to initiate the switch from P2P-based streaming to MBMS-based streaming,
wherein a multi-cell/multicast coordination entity (MCE)/mobile management entity (MME) decides, based on a counting of peers, to terminate the MBMS-based streaming and informs the BM-SC of the decision to terminate, and the BM-SC informs the device that the MBMS-based streaming will be terminated.

12. The radio communication network system of claim 11, wherein the device is a P2P tracker, which operates as a directory service for any peer seeking content.

13. The radio communication network system of claim 11, wherein the device is a P2P deputy operating as a proxy of the peers located in the broadcast area, streaming the same content using P2P-based streaming and having the MBMS-based streaming capability, relative to other peers, the P2P deputy being also the only peer for each of the peers located in the broadcast area, streaming the same content using P2P-based streaming and having the MBMS-based streaming capability.

14. A device for switching between a peer-to-peer (P2P) streaming service and a multimedia broadcast multicast streaming (MBMS) service in a radio communication network system, comprising:
an interface configured to enable communication with other devices in the radio communication network system; and
a data processing unit connected to the interface and configured (A) to count peers located in a broadcast area, streaming same content using P2P-based streaming and having an MBMS-based streaming capability, and (B) to cause core network components, an MBMS control system (BM-SC), and the peers located in the broadcast area, streaming the same content using P2P-based streaming and having MBMS-based streaming service capability to switch from P2P-based streaming to MBMS-based streaming, if a number of counted peers exceeds a first predetermined number, at least by sending a request message to the BM-SC to trigger the switch from the P2P-based streaming to the MBMS-based streaming,
wherein a peer is a user equipment initially receiving content using P2P-based streaming,
wherein the P2P streaming service is an Internet-based over-the-top (OTT) service,
wherein the device decides whether to initiate the switch from P2P-based streaming to MBMS-based streaming,
wherein a multi-cell/multicast coordination entity (MCE)/mobile management entity (MME) decides, based on a counting of peers, to terminate the MBMS-based streaming and informs the BM-SC of the decision to terminate, and the BM-SC informs the device that the MBMS-based streaming will be terminated.

15. The device of claim 14, wherein the device is a P2P tracker, which operates as a directory service for any peer seeking content.

16. The device of claim 14, wherein the data processing unit is further configured to enable the device to be a P2P deputy operating as a proxy of the peers located in the broadcast area, streaming the same content using P2P-based streaming and having the MBMS-based streaming capability, relative to other peers, the P2P deputy being also the only peer for each of the peers located in the broadcast area, streaming the same content using P2P-based streaming and having the MBMS-based streaming capability.

17. The device of claim 14, wherein the data processing unit is further configured to process P2P related messages received via the interface, each message including information on location of an individual peer, the content streamed by the individual peer using P2P-based streaming and whether the individual peer has the MBMS-based streaming capability, and counts the peers based on the information.

18. A computer-readable storage medium non-transitorily storing executable codes which when executed on a computer make the computer perform a method for switching between a peer-to-peer (P2P) streaming service and a multimedia broadcast multicast streaming (MBMS) service in a radio communication network system, the method comprising:
counting peers located in a broadcast area, streaming same content using P2P-based streaming and having an MBMS-based streaming capability; and
causing core network components, an MBMS control system (BM-SC) and the peers located in the broadcast area, streaming the same content using P2P-based streaming and having MBMS-based streaming capability to switch from P2P-based streaming to MBMS-based streaming, if a number of counted peers exceeds a first predetermined number, at least by sending a request message to the BM-SC to trigger the switch from the P2P-based streaming to the MBMS-based streaming, wherein a peer is a user equipment initially receiving content using P2P-based streaming, wherein the P2P streaming service is an Internet-based over-the-top (OTT) service, wherein the device decides whether to initiate the switch from P2P-based streaming to MBMS-based streaming, wherein a multi-cell/multicast coordination entity (MCE)/ mobile management entity (MME) decides, based on a counting of peers, to terminate the MBMS-based streaming and informs the BM-SC of the decision to terminate, and the BM-SC informs the device that the MBMS-based streaming will be terminated.

* * * * *